United States Patent [19]

Fruehan

[11] 3,954,445

[45] May 4, 1976

[54] METHOD OF CONTROLLING TEMPERATURE IN Q-BOP

[75] Inventor: Richard J. Fruehan, Franklin Township, Westmoreland County, Pa.

[73] Assignee: United States Steel Corporation, Pittsburgh, Pa.

[22] Filed: Aug. 30, 1974

[21] Appl. No.: 501,914

[52] U.S. Cl. .................................... 75/51; 75/56; 75/60
[51] Int. Cl.$^2$ .......................................... C21C 7/00
[58] Field of Search ............... 75/51, 52, 59, 60

[56] References Cited
UNITED STATES PATENTS 3,726,665  4/1973  Minnick .................................. 75/51
3,771,998  11/1973  Knuppel ................................ 75/51

Primary Examiner—Peter D. Rosenberg
Attorney, Agent, or Firm—Forest C. Sexton

[57] ABSTRACT

A method of producing steel in a bottom-blown oxygen steelmaking vessel wherein the use of scrap steel in the original charge is minimized or eliminated, and the final temperature of the charge is controlled by injecting thereinto 5 to 30 pounds of finely divided iron oxide per ton of charge metal before the carbon content of the charge is reduced to 0.3 percent.

9 Claims, No Drawings

METHOD OF CONTROLLING TEMPERATURE IN Q-BOP

BACKGROUND OF THE INVENTION

A relatively new process for making conventional steel, the bottom-blown oxygen steelmaking process, sometimes called the Q-BOP or OBM process, is beginning to receive considerable attention. Like the more conventional top-blown basic oxygen process (BOP process), the new bottom-blown oxygen process is a basic process utilizing a combination of an oxygen blow and lime-containing basic slag to remove impurities from the unrefined molten iron. Unlike the conventional top-blown process however, the new bottom-blown oxygen process blows oxygen through tuyeres extending through the vessel refractory lining below the molten metal surface. Each tuyere is substantially flush with the inside surface of the vessel refractory lining and is of a double-pipe construction wherein oxygen is blown through a central pipe which is surrounded by a larger concentric pipe for the simultaneous injection of a protective jacket fluid such as natural gas, propane or other gaseous or liquid fluid comprising or containing hydrocarbons. The hydrocarbon jacket fluid acts as a supercoolant, the hydrocarbon constituent endothermically dissociating to prevent a rapid increase in the metal temperature that would otherwise result from the oxidation reactions, and more importantly to cool the tuyeres and refractory material adjacent thereto to prevent the rapid erosion thereof.

Although the top-blown basic oxygen process utilizes only an oxygen blow, it has long been recognized that subsurface blowing with oxygen would not be commercially practicable. As noted above, subsurface oxidation reactions with pure oxygen are so violent and exothermic, that the molten iron would be heated to exceedingly high temperatures before the metal could be refined. Furthermore, any such subsurface tuyere for injecting only oxygen, and the refractories adjacent thereto would be very quickly burned away in a matter of seconds. As noted above, the bottom-blown oxygen process overcomes this problem by simultaneously injecting a jacket fluid which emerges from the tuyere concentrically surrounding the injected oxygen. Although practically any hydrocarbon would suffice as a jacket fluid, the most common jacket fluid used in the United States has been natural gas.

Experience with the bottom-blown oxygen process has shown that the ratio between the oxygen and the jacket fluid injection rates must be carefully controlled in order to control charge temperature and optimize tuyere and bottom refractory life. For example, using natural gas as the jacket fluid in conventional practices, it has been found that the natural gas injection rate should be within the range 5 to 10 volume percent of the oxygen injection rate, and preferably at approximately 8 volume percent. These ratios are for typical commercial practices wherein the original charge metal comprises 20 to 25 percent cold scrap. Since a considerable amount of heat is consumed during the first part of the blow in melting scrap, the scrap does act as a coolant, cooperating with the jacket fluid to maintain a reasonable charge temperature. The scrap does not however, have any appreciable cooling affect on the tuyeres and adjacent refractories. Here, the jacket fluid is the only effective coolant.

The new bottom-blown oxygen process has been widely acclaimed as having many advantages over prior art process, including its good appetite for scrap, i.e. the process typically consumes from 20–25 percent steel scrap. Although this feature was favorably regarded in the past when scrap was cheap and plentiful, more recent economic conditions have caused scrap prices to increase substantially, and scrap shortages have occurred in some locations. This has forced some steelmakers to look for practices which minimize the use of steel scrap. Although the amount of scrap that can be charged for making a heat in a bottom-blown oxygen vessel can be varied within limits, it has been found that scrap charges below about 20 percent of total charge metal do not lend themselves to efficient commercial operation. This is due to the fact, as noted above, that the scrap serves as a coolant in cooperation with the jacket fluid to keep the charge metal temperature at desired levels. As scrap contents are reduced below the 20 percent level, the final melt temperature after blowing is increased proportionally. Although it is possible to proportionally increase the injection rate of jacket fluid to counter-balance the reduced steel scrap charge, this tends to appreciably shorten the tuyere and vessel bottom life, because even modest increases in jacket fluid flow rates may cause localized over-cooling at the tuyere outlets causing molten charge metal to solidify at the outlet and eventually plug the tuyere.

SUMMARY OF THE INVENTION

An object of this invention is to provide a method for producing steel by the bottom-blown oxygen process wherein little or no charge scrap is required.

Another object of this invention is to provide a method for producing steel by the bottom-blown oxygen process wherein less than 15% charge scrap can be utilized without requiring an increase in jacket fluid flow rates and without causing an increase in final metal temperature.

A further object of this invention is to provide a method for producing steel by the bottom-blown oxygen process wherein temperature of the bath is controlled by controlled injection of iron oxide or other metallic oxides.

DESCRIPTION OF THE PREFERRED EMBODIMENT

It has been shown that in the bottom-blown oxygen process that as long as carbon contents are above about 0.3 percent, nearly all of the injected oxygen is utilized for decarburization. It is not believed however that the carbon is oxidized directly from the injected oxygen, but rather the most likely sequence of reaction first involves the formation of FeO liquid, as follows:

$$Fe(l) + 1/2 O_2(g) \rightarrow FeO(l)$$

This liquid FeO in turn reduces the carbon in the bath as follows:

$$FeO(l) + C \rightarrow Fe(l) + CO(g)$$

The rate of the secondary reaction is most likely controlled by the transport of carbon in the molten metal to the reaction interface. At high carbon levels the driving force is sufficient to insure this secondary reaction goes to completion. Below about 0.3% carbon however, the secondary reaction is incomplete. This is substantiated by the fact that the FeO content in the slag during the process remains quite low until the bath reaches about 0.3% carbon, and then it increases rather rapidly.

This invention is predicated upon the injection of iron oxide, $Fe_2O_3$, $Fe_3O_4$ and/or FeO which will readily reduce carbon from the melt, at carbon levels above about 0.3% much the same as does the FeO. At these higher carbon levels, these reactions, for example $$Fe_2O_3(s) + 3C \rightarrow 2Fe(l) + 3CO(g),$$

will go to completion even while the injected oxygen is reacting to substantial completion. The iron oxide reduction reaction however, is endothermic, and hence control of the iron oxide injection, at carbon levels above about 0.3% can be used to control temperature of the molten metal. Accordingly, melt temperature increases caused by decreasing scrap steel from the original charge can be compensated for by injecting iron oxide along with the oxygen while bath carbon contents exceed about 0.3%.

In the practice of this invention, conventional bottom-blown oxygen steelmaking facilities can be utilized, except that modifications must be made to allow for selective injection of the finely divided iron oxide. Although the iron oxide may be injected by various means for example pneumatically injected through a top lance, it is preferred to inject the oxide within the oxygen blow. This will not however require extensive engineering and development efforts since such technology is readily at hand due to the fact that most commercial bottom-blown oxygen process facilities have equipment associated therewith for injecting a finely divided lime or other flux in the oxygen blow. Hence, special manifolds, supply systems etc. are already in use which are designed to controllably introduce the flux into the oxygen blow. To provide equipment for injecting the finely divided iron oxide merely involves duplication of such flux feeding system.

To commence the practice of this process, a bottom-blown oxygen vessel is charged with the hot metal to be refined. Typically, such hot metal is blast furnace hot metal, the composition thereof being on the order of 4–5% carbon, 0.5–1.0% manganese, 1% silicon, 0.03–0.10% phosphorus, and 0.05% sulfur. The hot metal is usually charged at a temperature of 2380° to 2550°F. Whereas prior art bottom-blown oxygen practices would also charge 20 to 25% scrap, the primary object of this invention is to avoid or at least minimize the use of such scrap. Accordingly, the practice of this invention would utilize no such scrap or at most scrap in amounts up to about 15 weight percent of the total charge metal.

After the hot metal, and if desired, the limited amount of scrap, are charged to the vessel, blowing is commenced according to conventional commercial practices, preferably including a basic flux, such as lime, in the oxygen blow. The blow rates used should be substantially the same as those used in conventional practices for such vessel. The actual rates will depend upon vessel size and geometry, tuyere size, arrangement and metal chemistry. Typically, total oxygen injection will be within the range 1400 to 2000 cubic feet per ton of metal. As noted above, the jacket fluid flow rate for natural gas as a jacket fluid, should be approximately 8 volume percent of the oxygen flow rate to optimize tuyere and refractory bottom life. Typically, about one pound of lime is injected for every 10 cubic feet of oxygen.

The crux of this invention resides in simultaneously injecting finely divided iron oxide during the first part of the above blow before the carbon content in the hot metal is reduced to 0.3% for the purpose of maintaining the hot metal temperature at lower preferred levels. This will require iron oxide injections of from 5 to 30 pounds per ton of hot metal, depending upon amount of scrap steel charged, hot metal chemistry, starting hot metal temperature and the desired final hot metal temperature.

To exemplify the effect of iron oxide as a coolant, it is first noted that typical prior art practices, using a 20 percent scrap charge, will start with a hot metal temperature of 2380° to 2550°F. After the scrap is melted and the heat completely blown, the final metal temperature will be on the order of 2900° to 3000°F. If no scrap had been included in the above practice, final metal temperatures would be on the order of 3200° to 3300°F. Accordingly, the 20% scrap charge accounts for approximately a 300°F lowering of the final metal temperature. In the practice of this process therefore in those heats where no scrap steel is charged, sufficient iron oxide must be injected to compensate for this last cooling effect, i.e. sufficient to cool the steel by about 300°F. Since the reaction between $Fe_2O_3$ and carbon dissolved in liquid iron is endothermic to the extent of 132 kcal per mole of $Fe_2O_3$, this would require approximately 30 pounds of $Fe_2O_3$ per ton of hot metal assuming the $Fe_2O_3$ decarburization goes to reasonable completion. As discussed above, at hot metal carbon contents above 0.3% the reaction will go to substantial completion, requiring approximately 30 pounds of $Fe_2O_3$ per ton of hot metal to effect a 300°F temperature reduction. If some scrap is charged, then obviously a lesser amount of $Fe_2O_3$ need be injected. For example, a heat containing a 15% scrap charge, approximately 7 pounds of $Fe_2O_3$ per ton of charge metal should be injected. Progressively more $Fe_2O_3$ would be needed as the scrap charged is progressively reduced from 15% to the above noted 30 pounds of $Fe_2O_3$ per ton of metal with no charged scrap. As a rule of thumb, it can be said that every one pound of $Fe_2O_3$ injected per ton of metal will yield approximately a 10°F reduction in the final metal temperature. Combining this with the cooling effect of scrap, it can be seen that, for any given heat, for every percentage point reduction in scrap charge below the ideal 20%, the operator should inject 1.5 pounds of $Fe_2O_3$ per ton of charge metal, if the same end temperature is desired. Expressed mathematically this gives $$X \text{ pounds per ton } Fe_2O_3 = 1.5 (20-Y)$$

where Y equals the percent of scrap steel actually charged and X equals the amount of $Fe_2O_3$ in pounds per ton needed to effect the same finishing temperature. Although the above discussion has been limited to $Fe_2O_3$ as the cooling oxide, it should be noted that $Fe_3O_4$ and FeO would have cooling characteristics only slightly different from $Fe_2O_3$, so slight in fact that the above discussions on the amount of $Fe_2O_3$ to be added would hold true for $Fe_3O_4$ and FeO. Hence, the amount of any iron oxide to be added without changing final temperature would be 1.5 (20−Y) expressed in pounds per ton of charge metal, and where Y is the percentage scrap steel charged.

The above discussed relationships are of course merely illustrative of the cooling characteristics of iron oxide in the practice of this process. The relationships were based upon assumptions that the hot metal chemistry was typical, that a 20% scrap charge would be ideal for such a heat absent of course iron oxide injection, and that the same final temperature would be desired. In actual practice however, each heat is individually computed for ideal processing parameters depending upon hot metal chemistry, temperature and volume, the final desired chemistry temperature and other factors. In view of the many variable factors involved, a 20% scrap charge would not be ideal for every heat. Still, the 1 to 1.5 relationship described above would hold true for any given heat to be processed identically. Hence, assuming that for a given heat, the ideal scrap charge is computed to be $S_I$, and that the operator wishes to use an amount of scrap less than the computed $S_I$, say $S_A$, and he does not want to change his oxygen to jacket gas relationship nor change his final desired temperature, he could rely on the relationship $$X \text{ lb/ton iron oxide} = 1.5(S_I - S_A)$$

Here, the cooling affect lost by the reduced amount of scrap ($S_I - S_A$) would be compensated for by injecting X pounds per ton of iron oxide. As noted above of course, all this iron oxide must be injected into the heat before the carbon content of the heat is reduced to 0.3%.

In view of the above, it should be apparent that range for iron oxide of 5 to 30 pounds per ton of metal is based on the assumption that a 20% scrap charge would be ideal. Obviously, in some unusual situations it may be necessary to employ less than 5 or more than 30 pounds per ton of iron oxide.

Although the iron oxide injection rate is not critical, it is preferred that it be kept at a minimum rate to avoid possible clogging problems in the tuyeres or tuyere supply system. As noted however, the total iron oxide addition must be completed before the carbon content of the heat is reduced to 0.3%. Therefore, it is preferable that the iron oxide injection be commenced immediately upon commencement of blowing with oxygen, so that the injection rate may be minimized.

By injecting iron oxide into the hot metal charge, the oxygen content therein reacts with the carbon, and the iron content goes into the metal. Accordingly, practice of this process will cause an increase in metal yield. For example, each pound per ton of $Fe_2O_3$ injected into the charge will add 0.7 pounds of iron thereto to increase yield by 0.035%. Slightly higher yields will be obtained when injecting $Fe_3O_4$ or $FeO$.

It further follows that injection of iron oxide, and removal of carbon from the heat thereby, will allow for some reduction of the blown oxygen requirement. Each pound of $Fe_2O_3$ injected contains 0.3 pounds of oxygen. At the maximum injection of 30 pounds of $Fe_2O_3$ per ton of metal, this provides approximately a 9% savings of the total oxygen requirement, for a significant 9% saving in oxygen gas requirements, and of course a like saving in the jacket gas requirement.

I claim:

1. A method of producing steel in a bottom-blown oxygen steelmaking vessel, the steps comprising:
   a. forming a steelmaking heat within said vessel, said heat comprising a hot metal charge containing the usual impurities including carbon in an amount in excess of 0.3 percent and solid steel scrap in an amount of from 0 to 15 percent of the total heat formed;
   b. simultaneously blowing oxygen and a protective jacket fluid surrounding the blown oxygen into the heat for a time sufficient to oxidize a substantial amount of the impurities from the heat;
   c. during the above blowing step, injecting finely divided iron oxide into the heat in an amount within the range of 5 to 30 pounds of iron oxide per ton of metal in the heat, the iron oxide injected at a rate sufficient to add all the iron oxide to the heat before the carbon contnet of the heat is reduced to 0.3 percent; and
   d. tapping said heat.

2. The method of claim 1 in which the iron oxide is injected into the heat within the oxygen blow.

3. The method of claim 1 in which the amount of injected iron oxide is within the said range of 5 to 30 pounds of iron oxide per ton of metal in the heat and inversely proportional to the amount of scrap steel charged in step (a).

4. The method of claim 1 in which no solid steel scrap is used in forming the steelmaking heat and approximately 30 pounds of iron oxide per ton of metal is injected into the heat at step (c).

5. The method of claim 1 in which the amount of iron oxide to be injected in step (c) is determined by the equation:

$$X = 1.5 (20 - Y)$$

where X is the amount of iron oxide to be injected in pounds per ton of metal in the heat, and Y is the amount of scrap steel charged in step (a) in percent of total metal in the heat.

6. The method of claim 1 in which the amount of iron oxide to be injected in step (c) is determined by the equation:

$$X = 1.5 (S_i - S_a)$$

where X is the amount of iron oxide to be injected in pounds per ton of metal in the heat, $S_i$ is the ideal amount of scrap necessary to effect the desired final temperature if no iron oxide were to be added, and $S_a$ is the actual amount of scrap steel charged in step (a), $S_i$ and $S_a$ expressed is percent of total metal in the heat.

7. In the method of producing steel in a bottom-blown oxygen steelmaking vessel wherein a steemaking heat is formed within said vessel, said heat comprising a hot metal charge containing the usual impurities including carbon in an amount in excess of 0.3 percent and solid scrap steel, the amount of said scrap steel being predetermined on the basis of the amount thereof necessary to effect the desired final temperature, and wherein oxygen and a protective jacket fluid surrounding the oxygen are simultaneously blown into said heat for a time sufficient to oxidize a substantial amount of the impurities from the heat; the improvement comprising adding said solid scrap steel in an amount less than said predetermined amount and injecting finely divided iron oxide into the heat while the oxygen is being blown therethrough, the amount of said iron oxide injected being determined by the equation:

$$X = 1.5 (S_i - S_a)$$

where X is the amount of iron oxide to be injected in pounds per ton of metal in the heat, $S_i$ is the predetermined amount of scrap steel necessary to effect the final desired temperature, and $S_a$ is the actual amount of scrap steel injected, $S_i$ and $S_a$ expressed in percent of total metal in the heat, the entire amount of said iron oxide being injected before the carbon content of the heat is reduced to 0.3 percent.

8. The method of claim 7 in which said iron oxide is injected into the heat within the oxygen blow.

9. The method of claim 7 in which no solid scrap steel is added to the charge and the amount of iron oxide to be injected is determined by the equation:

$$X = 1.5 (S_i)$$

where X is the amount of iron oxide to be injected in pounds per ton of metal in the heat and $S_i$ is the predetermined amount of scrap steel necessary to effect the final desired temperature in percent of total metal in the heat.

* * * * *

UNITED STATES PATENT OFFICE
CERTIFICATE OF CORRECTION

Patent No. 3,954,445      Dated May 4, 1976

Inventor(s) Richard J. Fruehan

It is certified that error appears in the above-identified patent and that said Letters Patent are hereby corrected as shown below:

Column 5, line 27, "$(S_I 31 S_A)$" should read -- $(S_I - S_A)$ --.

Column 6, line 15, "contnet" should read -- content --.

Signed and Sealed this

Seventh Day of September 1976

[SEAL]

Attest:

RUTH C. MASON
*Attesting Officer*

C. MARSHALL DANN
*Commissioner of Patents and Trademarks*